Jan. 16, 1945.  C. S. KELLEY  2,367,586
VARIABLE LOAD BRAKE
Filed Nov. 3, 1942
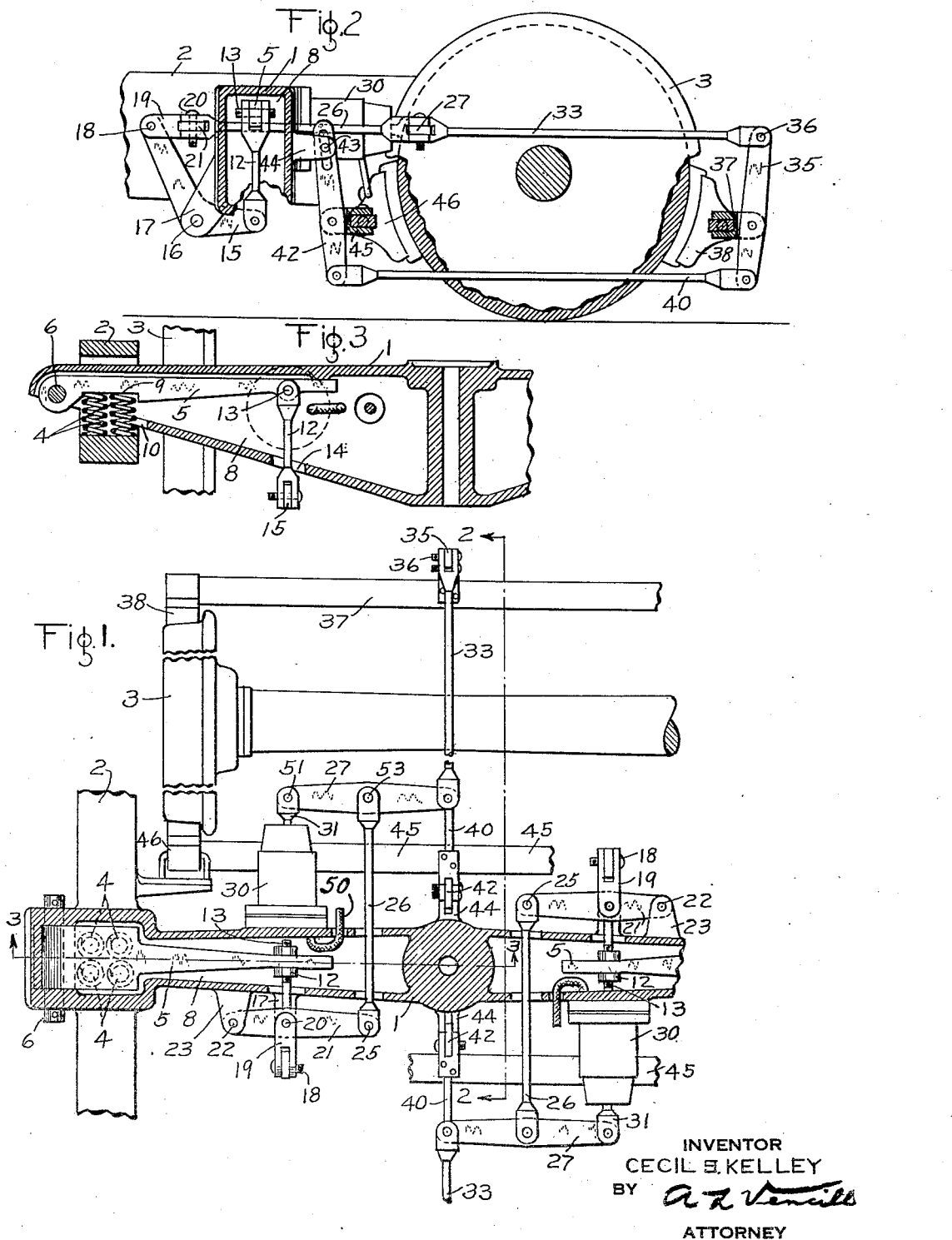
INVENTOR
CECIL S. KELLEY
BY
ATTORNEY Patented Jan. 16, 1945

2,367,586

UNITED STATES PATENT OFFICE 2,367,586

VARIABLE LOAD BRAKE

Cecil S. Kelley, Forest Hills, Pa., assignor to The Westinghouse Air Brake Company, Wilmerding, Pa., a corporation of Pennsylvania Application November 3, 1942, Serial No. 464,348

5 Claims. (Cl. 188—195)

This invention relates to railway vehicle brake apparatus and more particularly to variable load brake apparatus of the type in which the braking power is automatically varied according to the load on the vehicle.

The principal object of the invention is to provide an improved variable load brake apparatus of the above mentioned type.

Another object of the invention is to provide a variable load brake apparatus of the above type in which the brake forces on the vehicle are limited to some value proportional to the actual weight carried by the vehicle for all brake applications.

A further object of the invention is to provide means whereby excessive force applied to the brake shoes of a vehicle may become balanced with the weight of certain parts of the vehicle truck and the superposed vehicle body, and thus limit the force it is possible to exert on the brake shoes, so that it will not exceed in extent a predetermined percentage of the weight of the vehicle and its load.

A still further object of the invention is to provide means whereby the brake power for each vehicle truck of any given vehicle is automatically determined independently of the other truck thereof, according to the amount of the load bearing upon and sustained by said truck.

Other objects and advantages will appear in the following detailed description of the invention.

Fig. 1 is a plan view, partly in section, of a railway vehicle truck embodying the invention, parts of the truck and of the brake rigging being omitted to more clearly illustrate certain details of the invention.

Fig. 2 is a sectional view taken on the line 2—2 of Fig. 1 looking in the direction of the arrows.

Fig. 3 is a section of a vehicle truck and brake mechanism embodying the invention taken in the plane of the line 3—3 of Fig. 1.

As shown in the drawing, the variable load brake apparatus is applied to a railway vehicle truck which may be of the usual well known construction having a truck bolster 1, laterally spaced side frames 2, one of which is shown, which are rigidly carried in the usual manner on the wheel and axle assemblies 3. The bolster 1 is supported at each end by the usual bolster springs 4 through the medium of two weighing levers 5, one of which is disposed at each side of the vehicle. Inasmuch as the weighing levers at each end of the bolster, and the mechanism associated with the lever at each side of the vehicle are substantially alike it will suffice for the purpose of the specification to describe only one weighing lever and the mechanism associated therewith.

As shown in Figs. 1 and 3 of the accompanying drawing the end portion of the bolster 1 projects beyond the side frame 2 through the usual suitable bolster opening provided in the frame and outboard of the side frame carries a pin 6 upon which one end of the weighing lever 5 is pivotally mounted. The lever is contained in a cavity 8 formed in the bolster and extends longitudinally of the bolster to a point located near the central strut of the bolster. The under or lower side of the lever 5 is provided with a spring seat 9 upon which the upper end of the bolster supporting springs 4 seat, the bolster being provided with a suitable opening 10 to accommodate the springs.

The lever 5 adjacent its inner end is pivotally connected to the upper end of a vertically disposed link 12 by means of a pin 13. This link extends through a suitable opening 14 in the bolster and is connected at its lower end to one arm of a bell crank lever 15. The bell crank lever is rockably mounted on a pin 16 carried by a bracket 17, which bracket is rigidly attached to the bolster and extends downwardly and outwardly from one side thereof.

The other arm of the bell crank lever 15 is pivotally connected by means of a pin 18 to one end of a link 19, which extends in a direction longitudinally of the truck. The other end of this link is operatively connected by means of a pin 20 to a horizontally disposed dead lever 21 at a point intermediate the ends of the lever. The outer end of the lever 21 is pivotally connected by means of a pin 22 to a bracket 23 rigidly attached to and projecting from one side of the bolster. The inner end of lever 21 is operatively connected by means of a pin 25 to one end of a rod 26 which rod extends transversely of the bolster through suitable openings in the side walls thereof. The opposite end of the rod is connected to a horizontally disposed live brake cylinder lever 27 at a point intermediate the ends of the lever.

The equipment further comprises a brake cylinder device 30 having a cylinder which is rigidly secured in any suitable manner to the truck bolster 1 and which contains the usual piston having a push rod 31. The outer end of the push rod 31 is operatively connected to one end of the live brake cylinder lever 27. The opposite end of the brake cylinder lever 27 is connected to one end of a longitudinally extending pull rod 33 which rod in turn is connected at its opposite end to the upper end of a vertically disposed live lever 35 by means of a pin 36. Connected to the lever 35, at a point nearer to the lower end than to the top end, is a brake beam 37 which carries at each of its ends the usual brake shoe 38 which shoe is adapted to be moved into and out of frictional engagement with the tread of the adjacent vehicle wheel. The lower end of the lever 35 is operatively connected to one end of a longitudinally extending pull rod 40 which rod at its opposite end is operatively connected to the lower end of a vertically disposed dead lever 42 at the opposite side of the vehicle wheel. This lever 42 is connected at its upper end by means of a pin 43 to a bracket 44 attached to and projecting from the right-hand side of the bolster 1, as viewed in Fig. 3 of the accompanying drawing. Connected to the lever 42 in a manner described in connection with lever 35 is a brake beam 45 which carries at each of its ends a brake shoe 46 which shoe is also adapted to be moved into and out of engagement with the tread of the adjacent vehicle wheel.

It will be understood that when a sufficient downward force is exerted upon the lever 5 through the medium of link 12 the lever 5 will fulcrum about the bolster supporting springs 4 and lift the outer end of the bolster 1. It will also be understood that the downward force required to effect such movement of the lever will always be proportional to the degree of the load, starting from empty and progressing to a maximum point at full load.

Operation

Assuming the vehicle, embodying the invention to be fully loaded and the brakes on the vehicle released. Under these conditions the several parts of the apparatus will be in the position in which they are illustrated in the drawing.

When it is desired to effect an application of the brakes fluid under pressure is supplied to the brake cylinder in the usual manner by way of a flexible hose 50. Fluid under pressure thus supplied to the brake cylinder causes the push rod 31 to move in a direction away from the truck bolster 1 from the position in which it is shown in the drawing. As the push rod 31 moves in this direction it exerts a force upon the brake cylinder lever 27 at a point 51 which force tends to move the lever 27 and connected rod 26 in the same direction. However, movement of the rod 26 in this direction is opposed by the weight of the vehicle body and the weight of the lading imposed therein through the medium of lever 21, link 19, bell crank lever 15, link 12 and weighing lever 5, so that the rod 26 remains stationary, thus causing the lever 27 to rock in a clockwise direction about a pivot pin 53 which pin connects lever 27 to rod 26.

Now as the lever 27 continues to rock in a clockwise direction about the pivot pin 53 the rod 33 is caused to move in direction toward the bolster 1 thereby causing the brake shoes 38 and 46 to be moved into frictional engagement with the vehicle wheel in the usual well known manner through the medium of the vertical levers 35 and 42, connecting rod 40 and brake beams 37 and 45.

It should here be noted that since the vehicle is fully loaded the downward pressure of such loaded vehicle acting through the medium of the weighing lever 5 upon the bolster supporting springs 4 would be so great that the force exerted by the brake cylinder and acting through the aforementioned linkage to exert a downward force on the inner end of lever 5 will not be sufficient to effect movement of the lever. Since there is no movement of the weighing lever 5 the connected rod 26 will remain stationary and the pivot pin 53 which connects rod 26 to lever 27 will act as a stationary pivot about which the lever 27 will pivot, thus the force exerted by the pressure of fluid in the brake cylinder will be transmitted to the brake shoes through the brake cylinder lever 27 and rod 33 in the usual manner until the maximum degree is attained.

Assuming the vehicle is empty or is lightly loaded. In this case the downward pressure exerted by the weight of the vehicle body acting through the medium of the weighing lever 5 upon the bolster supporting springs 4 will be greatly reduced. As a result of the reduction in this pressure the downward force acting through the medium of link 12 and required to effect movement of the lever 5 will also be greatly reduced.

Now when fluid under pressure is supplied to the brake cylinder, the brake cylinder lever 27 and connected rod 33 will operate to effect movement of the brake shoe into engagement with the tread of the vehicle wheel in the same manner as hereinbefore described in connection with effecting an application of the brakes on a fully loaded vehicle.

As the pressure of fluid in the brake cylinder is increased, the force transmitted to point 51 of the brake cylinder lever 27 is increased and as a consequence the braking force at the brake shoes is increased. As the force transmitted to lever 27 is increased the force tending to move the connected rod 26 is of course increased. Now when this force acting through the medium of rod 26, lever 21, link 19, bell crank lever 15 and link 12 and acting downwardly on the inner end of weighing lever 5 has been increased to a degree approximately equal to the downward pressure of the weight of the vehicle body and its load, the maximum braking power will have been obtained. This is true for the reason that any further increase in the pressure of fluid transmitted to the lever 27 will act through the rod 26 and associated linkage to effect rotation of the weighing lever 5 about the springs 4 to lift the outer end of the bolster through the medium of pin 6, and thereby the vehicle body and its load. From this it will be understood that when the pressure of fluid in the brake cylinder acting through the aforementioned linkage has been increased to a degree sufficient to overcome the weight of the vehicle body and its load, the lever 27 will move with the push rod 31 in a direction away from the bolster 1. When this occurs any further increase in the pressure of fluid in the brake cylinder transmitted to the lever 27 is expended in raising the vehicle body and its load, without increasing the pressure of the brake shoes on the wheels. In other words, when the brake shoes act against the vehicle wheels, the weight of the vehicle body and its load acting through linkage maintains the fulcrum point for the brake cylinder lever stationary so that the brake rigging will act as usual to effect an application of the brakes until the maximum braking power is attained, and the maximum braking power will always be directly proportional to the weight of the vehicle and its load.

Having now described the invention, what I claim as new and desire to secure by Letters Patent is:

1. In a variable load brake apparatus for a vehicle comprising in combination, a vehicle truck having a side frame, a truck bolster, brake shoes, a brake cylinder attached to one side of said bolster, a live brake cylinder lever being disposed at the same side of the bolster operatively connected to said brake cylinder for moving said brake shoes into and out of engagement with the vehicle wheels, a dead brake lever disposed at the opposite side of the bolster, a rod extending through said bolster operatively connecting said live brake cylinder lever to said dead brake lever, a weighing lever pivotally connected at one end to said bolster and operative to lift said bolster, a bell crank lever pivotally carried by said bolster operatively connected to said dead brake lever and the free end of said weighing lever, said bell crank lever being operative to actuate said weighing lever when the force transmitted from said brake cylinder is sufficient to overcome the opposing force offered by the weighing lever.

2. In a variable load brake apparatus for a vehicle comprising, in combination, a vehicle truck having a side frame, a hollow truck bolster, bolster springs supporting the outer end of said bolster in said frame, a weighing lever contained in said bolster and pivotally connected at one end to the outer end of said bolster and having a spring seat adjacent said one end upon which said springs seat, said weighing lever being operative to fulcrum on said springs and lift said bolster, brake shoes, means for moving said shoes into and out of frictional engagement with the vehicle wheel, said means including a brake cylinder attached to one side of said bolster and a brake cylinder lever operatively connected at one end to said brake cylinder, a fulcrum pin for said brake cylinder lever disposed at a point intermediate the ends of the brake cylinder lever, a brake lever disposed at the opposite side of said bolster, a rod extending through said bolster for operatively connecting said fulcrum pin to one end of said brake lever, and means including a bell crank lever pivotally carried at said opposite side of the bolster for operatively connecting said brake lever to the free end of said weighing lever whereby the fulcrum pin is maintained stationary by the weight of the vehicle body and its load so long as the force exerted by said brake cylinder and transmitted to said means is insufficient to actuate said weighing lever.

3. In a variable load brake apparatus for a vehicle comprising in combination a vehicle truck, a truck bolster, bolster springs supporting the outer end of said bolster, a brake cylinder carried by said bolster, a brake cylinder lever operatively connected at one end to said brake cylinder and connected at the opposite end to a rod by which power exerted by the brake cylinder is transmitted to set the brakes on the vehicle, a fulcrum pin for said brake cylinder lever disposed at a point intermediate the ends of said lever, a mechanism for holding said fulcrum pin in a normal position by the weight or a portion of the weight of the vehicle body and its load and adapted to yield when the force applied thereto attains a predetermined degree relative to said weight, whereby the power transmitted to set the brakes is limited in its effect to a maximum determined by the weight of the vehicle body and its load, said mechanism comprising a weighing lever pivotally connected at one end to said bolster and at the opposite end to a link and adapted to fulcrum on said bolster springs to lift said bolster, a brake lever pivotally connected at one end to said bolster and connected at the opposite end to said fulcrum pin and a bell crank lever pivotally carried by the bolster having one arm connected to the free end of the weighing lever and another arm connected to the brake lever at a point between the ends thereof.

4. In a variable load brake apparatus for a vehicle comprising, in combination, a vehicle truck, a truck bolster, bolster springs supporting the outer end of said bolster, brake beams, brake shoes carried by said brake beams adapted to engage the wheels of said vehicle, means including a brake cylinder and a brake cylinder lever operatively connected at one end to said brake cylinder for actuating said brake beams, a mechanism operative to limit the effective brake pressure exerted by the brakes shoe against the wheels of the vehicle in proportion to the weight of the vehicle body and its load, said means comprising a lever operatively connected at one end to said bolster, a rod operatively connected at one end to the opposite end of said lever, the opposite end of said rod constituting a fulcrum for said brake cylinder lever, a bell crank lever pivotally carried by said bolster having one arm connected to said lever at a point between the ends thereof and another arm connected to the free end of a weighing lever fulcrumed on said bolster springs and pivotally connected at the opposite end to the outer end of said bolster.

5. In a variable load brake apparatus for a vehicle comprising in combination, a vehicle truck having a side frame, a truck bolster, bolster springs supporting the end of said bolster in said frame, a weighing lever interposed between said bolster and said springs pivotally connected at one end to said bolster and operative to lift said bolster, said springs, constituting a fulcrum for said lever, brake shoes, a brake cylinder attached to one side of said bolster, a brake cylinder lever operatively connected at one end to said brake cylinder for moving said brake shoes into and out of engagement with the vehicle wheel, a brake lever disposed at the opposite side of the bolster and connected at one end to said bolster, a fulcrum pin for said brake cylinder lever disposed at a point intermediate the ends thereof, a rod connected at one end to said fulcrum pin and at the opposite end to the opposite end of said brake lever, said rod extending through said bolster, and a bell crank lever pivotally carried by said bolster disposed at said opposite side of the bolster having one arm connected to a point between the ends of said brake lever and another arm connected to the free end of said weighing lever, said bell crank being operative to actuate said weighing lever when the force transmitted from said brake cylinder to said one arm of the bell crank lever is sufficient to overcome the opposing force offered by weighing lever.

CECIL S. KELLEY.